United States Patent [19]
Robertson

[11] Patent Number: 6,009,482
[45] Date of Patent: Dec. 28, 1999

[54] METHOD AND APPARATUS FOR ENABLING CACHE STREAMING

[75] Inventor: Paul Gordon Robertson, Austin, Tex.

[73] Assignee: International Business Machines Corporation, Armonk, N.Y.

[21] Appl. No.: 08/829,554

[22] Filed: Mar. 28, 1997

[51] Int. Cl.⁶ .............................. G06F 12/00; G06F 13/00
[52] U.S. Cl. .................... 710/35; 711/118; 710/119; 710/107; 710/113; 710/126
[58] Field of Search ...................... 711/140, 169, 711/118; 395/308, 306, 855, 287, 293, 299; 710/35, 119, 107, 113, 126

[56] References Cited

U.S. PATENT DOCUMENTS

| | | | |
|---|---|---|---|
| 4,853,848 | 8/1989 | Mitsuhashi et al. | 364/200 |
| 5,537,555 | 7/1996 | Landry et al. | 395/306 |
| 5,559,968 | 9/1996 | Stancil et al. | 395/306 |
| 5,596,729 | 1/1997 | Lester et al. | 395/308 |
| 5,781,925 | 7/1998 | Larson et al. | 711/140 |

*Primary Examiner*—Eddie P. Chan
*Assistant Examiner*—Kimberly McLean
*Attorney, Agent, or Firm*—Robert V. Wilder; Volel Emile

[57] ABSTRACT

A process and implementing computer system in which an arbitration circuit is comprised of a plurality of state machines 301, 303 and 305 which combine to receive various system timing signals and provide a data bus grant signal effective to enable data streaming of sequential data blocks of information from an L2 cache memory 109 without intervening wait states between the data blocks.

9 Claims, 5 Drawing Sheets

METHOD AND APPARATUS FOR ENABLING CACHE STREAMING

FIELD OF THE INVENTION

The present invention relates generally to information processing systems and more particularly to an improved method and device for streaming multiple memory lines from cache memory.

BACKGROUND OF THE INVENTION

Computer systems typically include a central processing unit or CPU, a memory subsystem, and input/output devices, including but not limited to a mouse, a keyboard, disk drives, a display unit, a printer and possibly connections to a network. Many systems further include a plurality of processors or CPUs. Most systems also include a second level cache memory subsystem, or L2 cache, which is designed to include a limited but faster memory than a main system memory for storage of information which is accessed more frequently than other information which may be stored in the relatively slower system main memory. All of these components are typically connected together through a local bus system which has direct connections to the L2 cache as well as to the main system memory.

Many CPU units have the capability to process so-called "burst" access grants to various components within a computer system. When a burst access is initiated, the main system memory is able to read or write longer streams of information than normal without being interrupted by subsequent requests for access to different addresses in main memory from different computer system components. This burst mode is effective to increase the processing speed of a system, especially when large amounts of information are being processed, since larger segments of the information can be transferred in single bursts without intervening wait states, and memory arbitration and access delays, which would otherwise be incurred in transferring smaller segments of information in iterative successive sequences.

Typically, accesses to memory are controlled by a system memory controller which usually includes memory access request arbitration circuitry designed to sort out various requests for access to the main system memory by various components of the computer system, and to grant requests in a grant order calculated to most effectively and expeditiously transfer the requested information. In general, the priorities for the memory controllers, and included arbitration circuits, are relatively well established to optimize information flow into and out of system main memories. However, there has been little if any improvement in the optimization of information transfer into and out of the relatively faster cache memory subsystems of computer systems. Moreover, even improved cache memory systems are limited by the existing schemes for arbitrating and controlling system memory access requests on a system level. Accordingly, there is a need for an improved arbitration device and cache memory, including a cache memory access arbitration technique capable of enabling a faster transfer of information between cache memory and computer system components requesting access to information stored in the cache.

SUMMARY OF THE INVENTION

A method and implementing system are provided in which an arbitration circuit, comprising a plurality of state machines, receives various system timing signals and provides a data bus grant signal which is effective when applied to a cache memory circuit to enable data streaming from the cache memory of successive data block transfers without intervening wait states between individual data block transfers.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
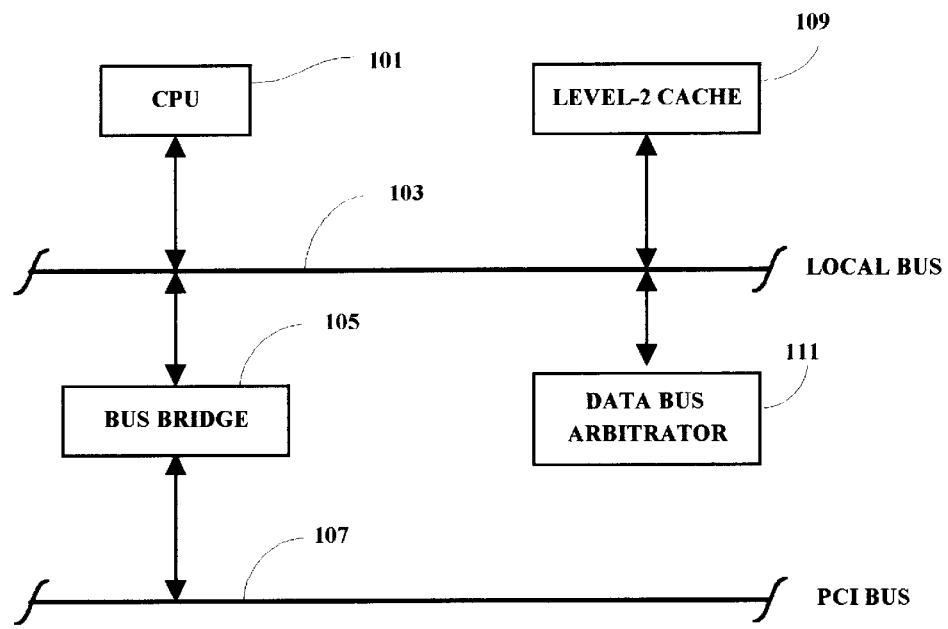
FIG. 1 is a simplified block diagram of a portion of a computer system including a data bus arbitrator circuit and L2 cache implemented in accordance with the present invention.

With reference to FIG. 1, the various methods discussed above may be implemented within a typical computer system, which may include personal computers, workstations or various combinations of such information processing devices arranged in a network configuration. An exemplary embodiment includes a central processing unit (CPU) 101, such as a conventional microprocessor, and a number of other units interconnected through a system local bus 103. For purposes of the present disclosure, the local bus shown in the exemplary embodiment is shown as being connected through a bridge circuit 105 to another system bus 107, which may be a so-called "PCI" bus, although the processing methodology disclosed herein will also apply to future bus configurations and is not limited to any particular bus scheme. The local bus 103 and the PCI bus 107 may include further connections to other workstations or networks, other peripherals and the like. The system shown in FIG. 1 also includes a Level-2 or L2 cache memory 109 connected to the local bus 103. A data bus arbitrator circuit 111 is also shown connected to the local bus 103. Since the workstation or computer system within which the present invention is implemented is, for the most part, generally known in the art and composed of electronic components and circuits which are also generally known to those skilled in the art. Further system-level details beyond those shown in FIG. 1, are not illustrated beyond that shown, since the illustration presented is considered sufficient for the understanding and appreciation of the underlying concepts of the present invention, and also in order not to obfuscate or distract from the teachings of the present invention.

Figure 2:
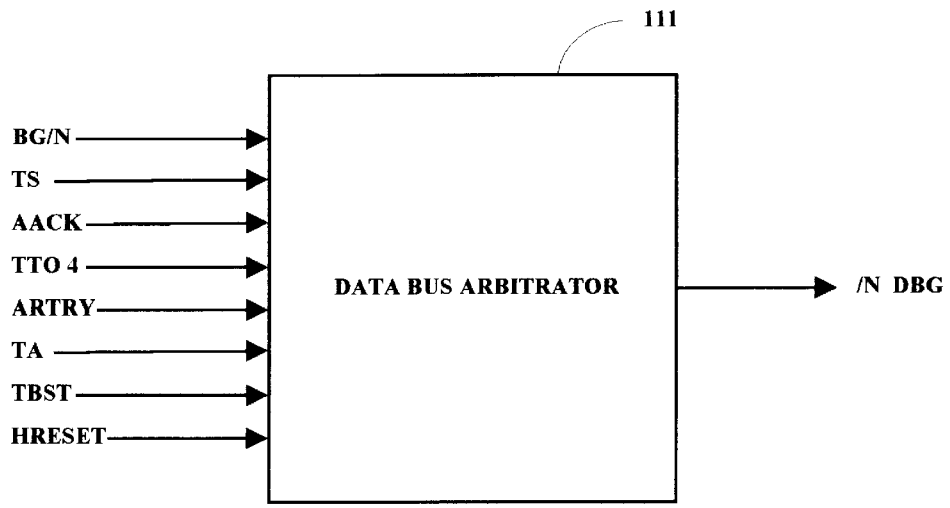
FIG. 2 is a simplified block diagram of the data bus arbitrator circuit shown in FIG. 1.

In FIG. 2, the data bus arbitrator circuit 111 of FIG. 1 is shown including the major arbitrator input and output signals. The input signals include: a bus grant signal BG which is asserted every time N that an access has been granted by the memory controller circuit 105 to a system component to access the local bus 103; a transfer start signal TS; an address acknowledge signal AACK; a transfer type signal TT, which may be representative of one of a plurality of types of information transfers, including but not limited to a read signal, a write signal, a burst read signal, a burst write signal, etc. Other arbitrator input signals include: an address retry signal ARTRY; a transfer acknowledge signal TA; a transfer burst signal TBST; and a hardware reset signal HRESET. The data bus arbitrator circuit provides a data bus grant output signal DBG. There is a unique BR (Bus Request), BG (Bus Grant) and DBG for each bus master. A device, for example a processor, will assert a BR when it needs to start a data transfer. The address bus arbitrator will grant the bus by responding with the bus grant signal BG and then the processor will assert the transfer start TS signal to start the transfer. The data bus arbitrator will then grant the data bus with the data bus grant DBG signal.

Figure 3:
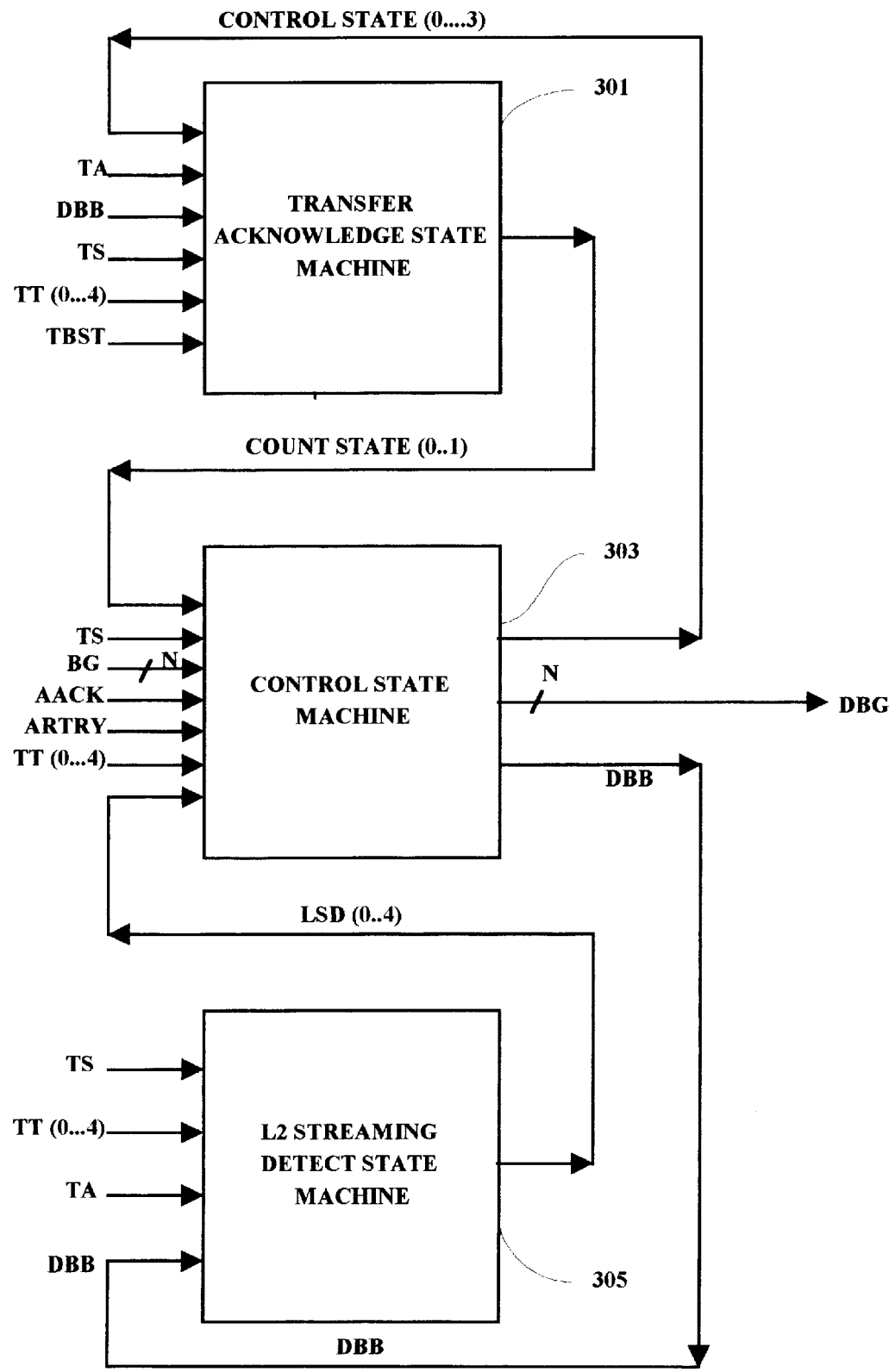
FIG. 3 is a more detailed block diagram of the arbitrator circuit illustrating three major functional engines included therein.

As shown in FIG. 3, there are three major state machines included within the data bus arbitrator circuit 111, i.e., a transfer acknowledge state machine 301, a control state machine 303 and an L2 streaming detect state machine 305. The transfer acknowledge state machine receives a control state input signal which is representative of one of a plurality of control states. The transfer acknowledge state machine also receives input signals TA, DBB (provided by an output of the control state machine 303), TS, TT(0..4) and TBST. The transfer acknowledge state machine provides an output count state signal which is applied to one input of the control state machine 303.

The control state machine 303 receives other inputs including TS, BG, AACK, ARTRY, TT(0..4), and a L2 streaming detect signal LSD(0..4) which is applied from an output of the L2 streaming detect state machine 305. The control state machine 303 provides a control state (0..3) output signal which is applied to one input of the transfer acknowledge state machine 301. The control state machine 303 also outputs a DBB output signal which is applied to one input of the L2 streaming detect state machine 305. A third output signal, a data bus grant signal DBG, which is also the output signal from the data bus arbitrator circuit, is provided by the control state machine 303.

The output signal LSD(0..4) from the L2 streaming detect state machine 305 is applied as one input to the control state machine 303. The L2 streaming detect state machine 305 receives input signals including TS, TT(0..4), TA and also the DBB signal provided from the output of the control state machine 303. The timing charts illustrated in FIG. 4 and in FIG. 5 are shown in order to explain the relationship between and among the various system signals shown such as to specify the requirements of the state machines 301, 303 and 305 in implementing the methods disclosed herein. The state machines 301, 303 and 305 may be constructed in various specific logic implementations to accomplish the various timing relationships between and among the system signals shown.

Figure 4:
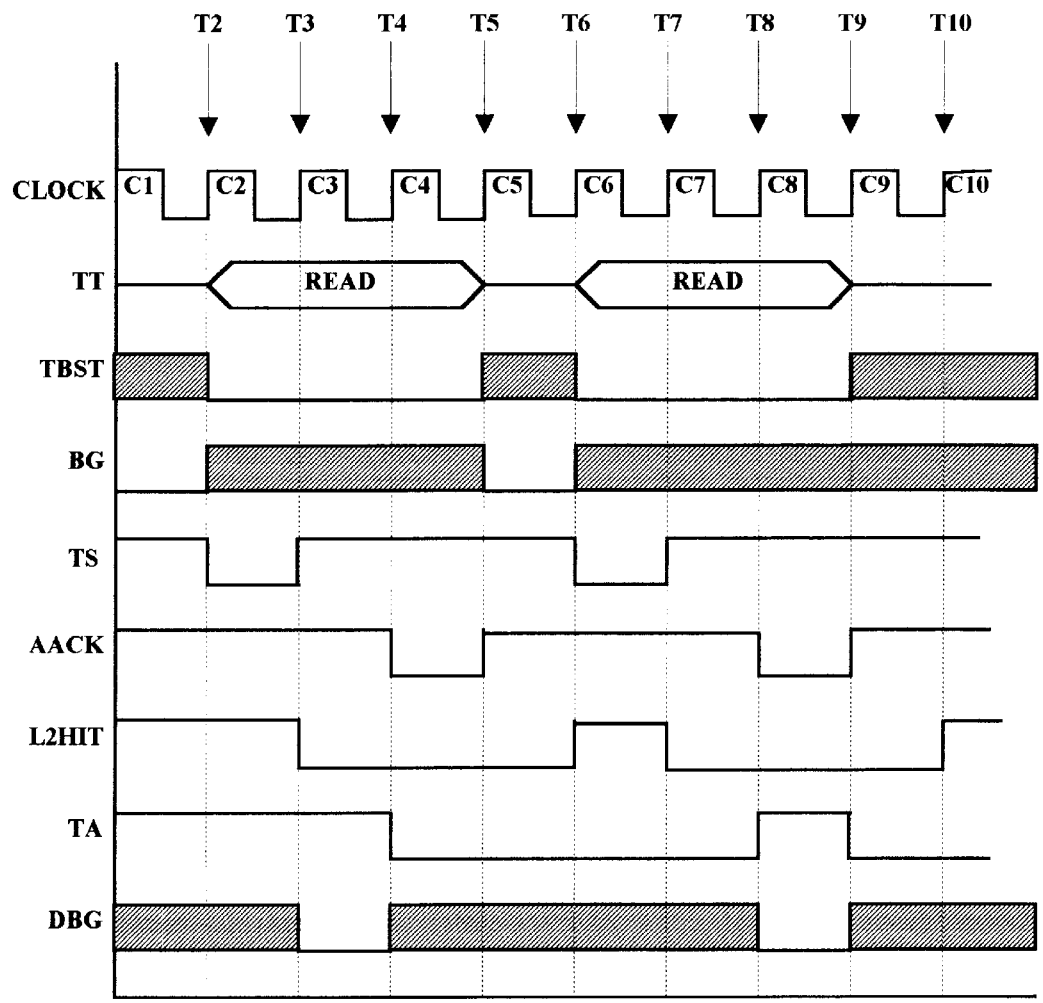
FIG. 4 is a signal timing chart illustrating various signal inter-relationships without cache streaming techniques.
Figure 5:
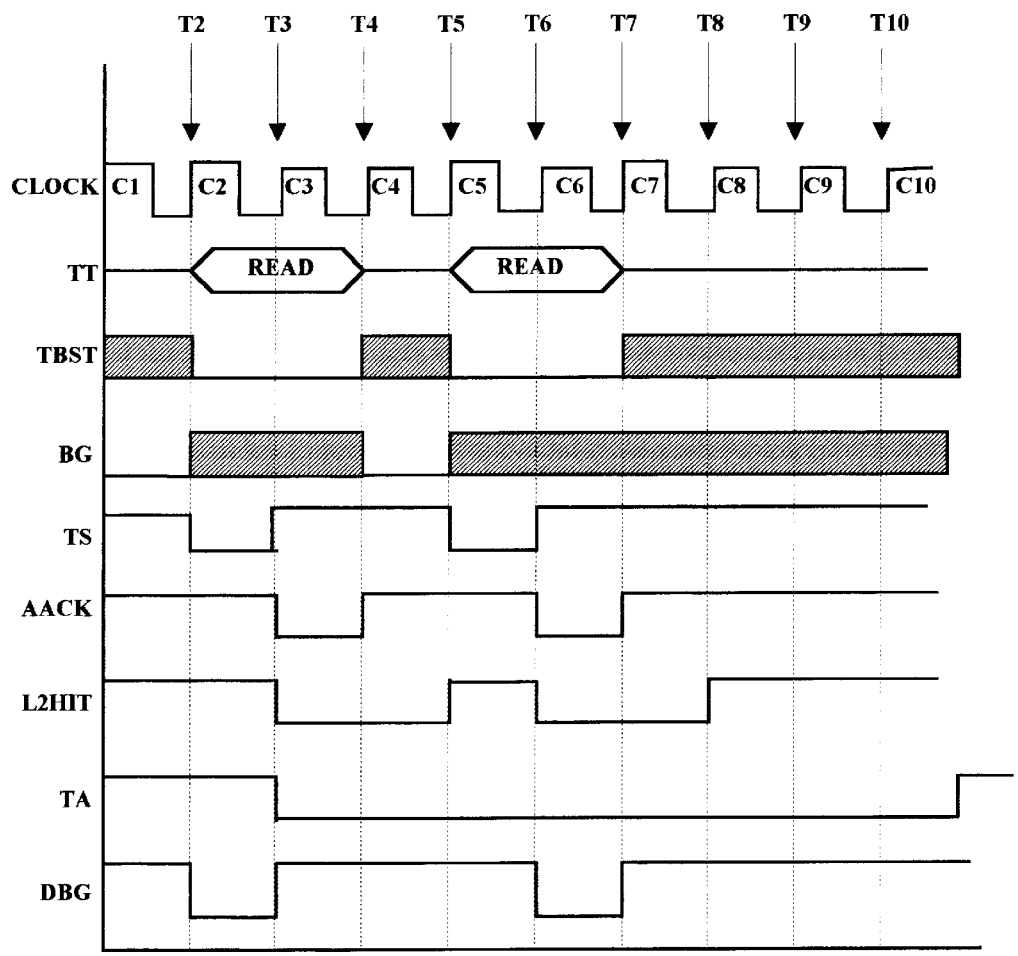
FIG. 5 is a signal timing chart illustrating various signal inter-relationships with the implementation of cache streaming techniques.

In FIG. 4, various signals are illustrated as present in a system which does not employ the fast L2 streaming techniques herein disclosed. The FIG. 4 timing chart provides an example of normal timing for a 2-cache-line read from L2 cache. In FIG. 5, the signal relationships as shown are effective to accomplish the fast L2 streaming method for L2 cache memory. The FIG. 5 timing chart illustrates the timing of various signals during L2 cache streaming for a two cache line reading from L2 cache. In the present example, each cache line includes 32 bytes and the data bus width is 8 bytes. Therefore, a transfer of one line of data from L2 cache would require 4 data clocks of 8 bytes each. A two line transfer then would require 8 data clocks of 8 bytes each. In accordance with the present invention, the second block to be transferred is addressed before the first block transfer has been completed.

The L2 cache circuit can take advantage of a fast L2 streaming mode which is supported by certain processors.

However, the fast L2 streaming mode requires very specific data bus arbitration behavior and is typically not implemented. In the present implementation, data bus arbitration and enhanced L2 streaming logic is included within a new data bus arbitrator circuit which includes three functional state machines as hereinbefore described. As used herein, fast L2 streaming is the ability of a processor to retrieve multiple cached memory lines from L2 cache without any intervening "wait states". For example, if five cache lines were read from L2 in quick succession, in the absence of fast L2 streaming, there would be a two clock wait state required before each cache line read. With fast L2 streaming, all five lines can be read out of L2 cache without incurring any intervening waits states. This process typically results in a significant reduction in transaction time.

In FIG. 4, an exemplary operation without cache data streaming is illustrated. In FIG. 4 and FIG. 5, times T1–T10 correspond to the beginning of clock pulses C1–C10, respectively, for reference purposes. Initially, BG goes active at T1 as the processor 101 is granted the address bus. At the next clock pulse T2, the processor starts the transfer as TS goes active. At time T3, it has been determined that L2 has the data requested as indicated by the L2HIT signal going active. The data bus arbitrator DBA then grants the data bus to the processor with signal DBG going active. At time T4, the cache 109 acknowledges the data bus grant and begins to transfer data as the AACK and TA signals go active. With existing arbitration schemes, the next data block can begin to cycle out of the cache, at the earliest, at time T9 when the transfer data signal TA again goes active low and the read process may be repeated.

In FIG. 5, an exemplary operation with cache data streaming is illustrated. Again, the bus grant signal BG goes active and at time T2, the process starts the transfer operation as TS goes active. At the same time T2, the data bus arbitrator grants the data bus to the processor 101 as the data bus grant signal DBG goes active. AT time T3, it has been determined that the L2 cache 109 has the data as L2HIT goes active. Also, the transfer start is acknowledged AACK and the transfer of data TA signal goes active as data is transferred. It is noted that with the cache streaming methodology as herein disclosed, the data transfer will, in the present example, remain active for eight clock cycles without further arbitration or access delays, thereby optimizing data transfer from the L2 cache memory. At time T4, the processor again grants the address bus BG and starts the next transfer TS at time T5. At time T6, it is determined that the next block of data is also in the cache L2HIT, the transfer start is again acknowledged AACK and the data bus arbitrator grants the data bus to the processor 101. The L2 cache 109 then begins transferring the next block of data without intervening wait states.

The data bus arbitrator circuit in the present example, is also able to effectively disable any conflicting circuitry in a system memory controller which may otherwise cause an operational or functional conflict with the present data bus arbitrator circuit in controlling the operation of the L2 cache. This can be achieved, for example, by configuring the memory controller in hardware or software to disable its data bus arbitrator (DBA), or the memory controller's DBG signals may be left unconnected and the DBG signals are then taken from the enhanced data bus arbitrator.

Figure 6:
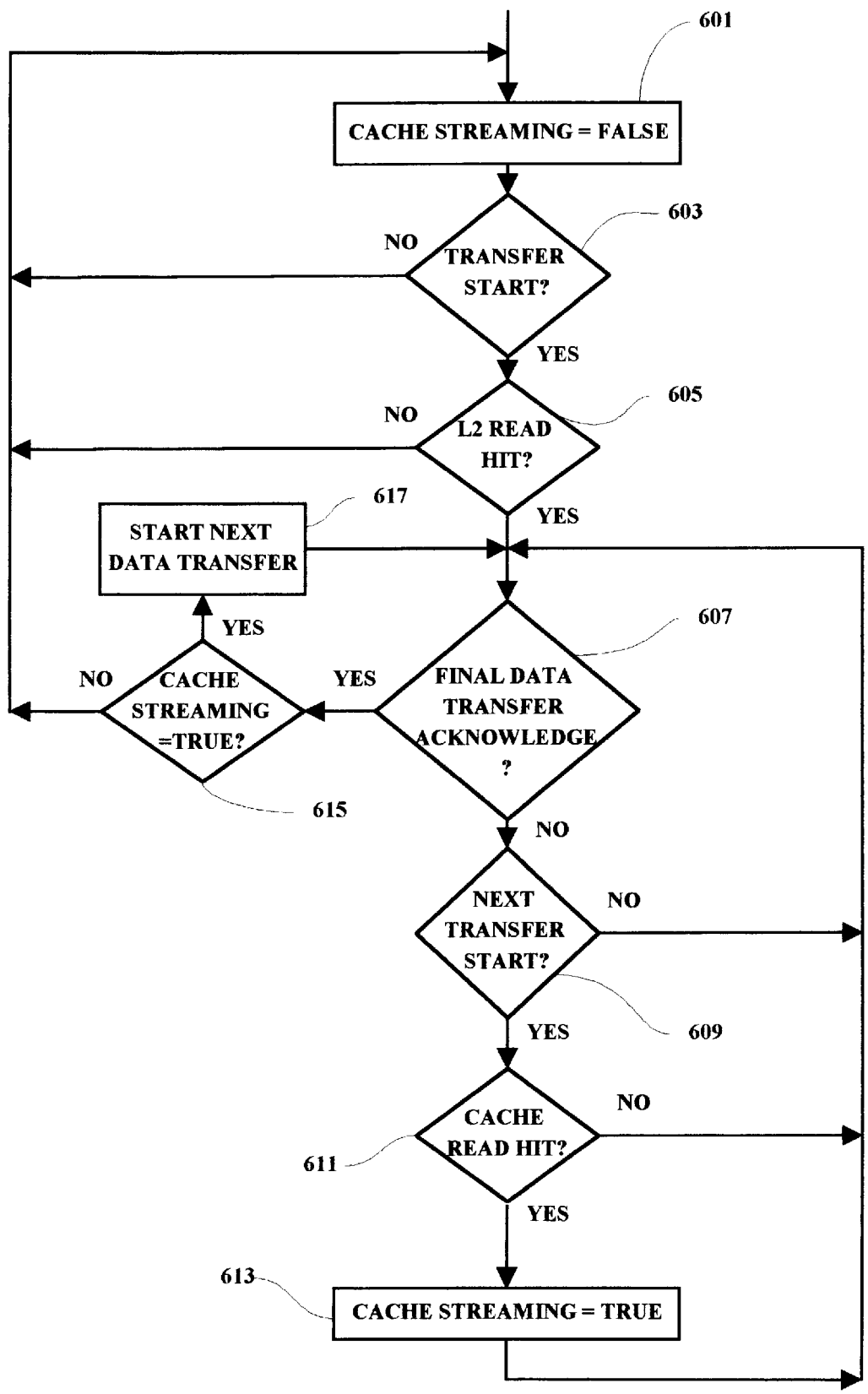
FIG. 6 is a flowchart illustrating an exemplary process flow implemented in accordance with the methodology disclosed herein.

The enhanced data bus arbitrator circuit has been implemented using state machines to monitor various bus control signals and generate the required data bus grant DBG signals. One DBG signal must be generated for each bus master in the system. A bus master can request the bus by asserting its bus request signal BR. The system processor 101 can request the bus 103 as well as the write-back capable L2 cache 109. In the case of symmetric multiprocessing, each additional processor of a plurality of processors (not shown) can request the bus 103. Fast L2 streaming can only occur when a processor-initiated cache line read from L2 is pipelined on top of another processor-initiated cache line read from L2. Data transferred for the pipelined L2 read can begin immediately after the initial L2 read without inserting any wait states. To do this, the enhanced data bus arbitrator 201 must assert the processor's data bus grant DBG output signal coincident with the last clock of data of the first L2 "read". The DBG signal is asserted in this manner only if all prerequisites for L2 streaming are met, i.e. when a processor-initiated cache line read from L2 is pipelined on top of another processor-initiated cache line read from L2. This is true since otherwise, the processor's specified protocol would be violated which would result in incomplete data transfers and system hang-up. In FIG. 6, an exemplary methodology is initiated by setting a cache streaming flag to a "false" indication 601. Next the process looks for a transfer start TS signal 603 from the processor 101. It is then determined whether the requested transfer is located 605 in the cache memory 109. If not, the illustrated process cycles back to the beginning 601 to await the next TS signal. If, however, the requested transfer information is present 605 in the cache memory 109, the process determines when the final transfer acknowledge signal TA for the requested transfer has occurred 607. As hereinbefore noted, in the present example, there are 32 bytes of information per line of cache and since the data bus width is 8 bytes wide, there will be four blocks of 8 bytes each to transfer one line of memory from cache. While the four data segments are being transferred, and before the final data transfer acknowledge signal is sensed 607, the method continues by checking if a next transfer start signal has been asserted 609 by the processor 101. If not, the methods continues to check for a final data transfer acknowledge signal TA. However, if a pipelined transfer signal TS has been asserted 609 by the processor 101 during a data transfer from cache, it is determined whether the data is in the cache memory 611 and if so, the cache streaming flag is set to "TRUE", and the method returns to check for the final data transfer acknowledge signal 607. When the final data transfer of the last of the four 8-byte blocks from the line of cache being read has been transferred, the process checks for the streaming flag 615 and if the streaming flag has been set, the next pipelined data transfer is started 617 without incurring any wait states between sequential data transfers from cache.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a CPU or other system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. An arbitration circuit for use with an information processing system, said information processing system including a bus, said information processing system further including a cache memory and a processor, said cache memory and said processor being coupled to said bus, said arbitration circuit comprising:

a first circuit device coupled to said bus, said first circuit device being operable for providing a count output signal representative of a count status of said information processing system;

a second circuit device coupled to said bus, said second circuit device being operable for providing a streaming output signal representative of a streaming status of said cache memory; and a third circuit device coupled to said bus, said third circuit device being responsive to said count output signal and said streaming output signal for providing a data bus grant signal, said data bus grant signal being coupled to said cache memory, said cache memory being responsive to said data bus grant signal for enabling a cache streaming status, said cache memory being effective in said streaming status for providing sequential information transfers from said cache memory without intervening wait states.

2. The arbitration circuit as set forth in claim 1 wherein said first, second and third circuit devices are state machines.

3. The arbitration circuit as set forth in claim 1 wherein said third circuit device is further operable to provide a control status output signal, said control status output signal being applied to an input terminal of said first circuit device.

4. The arbitration circuit as set forth in claim 1 wherein said third circuit device is further operable to provide a bus status output signal, said bus status output signal being applied to an input terminal of said second circuit device.

5. An information processing system comprising:

a processor device;

a bus system connected to said processor device;

a cache memory coupled to said bus system; and an arbitration circuit coupled to said bus system, said arbitration circuit further including:

a first circuit device coupled to said bus, said first circuit device being operable for providing a count output signal representative of a count status of said information processing system;

a second circuit device coupled to said bus, said second circuit device being operable for providing a streaming output signal representative of a streaming status of said cache memory; and a third circuit device coupled to said bus, said third circuit device being responsive to said count output signal and said streaming output signal for providing a data bus grant signal, said data bus grant signal being coupled to said cache memory, said cache memory being responsive to said data bus grant signal for enabling a cache streaming status, said cache memory being effective in said streaming status for providing sequential information transfers from said cache memory without intervening wait states.

6. The arbitration circuit as set forth in claim 5 wherein said first, second and third circuit devices are state machines.

7. The arbitration circuit as set forth in claim 5 wherein said third circuit device is further operable to provide a control status output signal, said control status output signal being applied to an input terminal of said first circuit device.

8. The arbitration circuit as set forth in claim 5 wherein said third circuit device is further operable to provide a bus status output signal, said bus status output signal being applied to an input terminal of said second circuit device.

9. A method for use with an information processing system, said information processing system including a bus, said information processing system further including a cache memory and a processor, said cache memory and said processor being coupled to said bus, said method comprising:

providing a count output signal representative of a count status of said information processing system;

providing a streaming output signal representative of a streaming status of said cache memory; and providing a data bus grant signal, said data bus grant signal being coupled to said cache memory, said cache memory being responsive to said data bus grant signal for enabling a cache streaming status, said cache memory being effective in said streaming status for providing sequential information transfers from said cache memory without intervening wait states.

* * * * *